US010523451B2

(12) United States Patent
Phillips et al.

(10) Patent No.: US 10,523,451 B2
(45) Date of Patent: Dec. 31, 2019

(54) SYSTEM, APPARATUS, AND METHOD PROVIDING DATA CAP AVOIDANCE

(71) Applicant: TELEFONAKTIEBOLAGET LM ERICSSON (PUBL), Stockholm (SE)

(72) Inventors: Chris Phillips, Hartwell, GA (US); Robert Hammond Forsman, Sugar Hill, GA (US); Jennifer Ann Reynolds, Duluth, GA (US); Vishal Changrani, Duluth, GA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 335 days.

(21) Appl. No.: 15/437,049

(22) Filed: Feb. 20, 2017

(65) Prior Publication Data
US 2018/0013572 A1 Jan. 11, 2018

Related U.S. Application Data

(60) Provisional application No. 62/359,374, filed on Jul. 7, 2016.

(51) Int. Cl.
*H04L 12/24* (2006.01)
*H04L 12/28* (2006.01)
*H04L 12/911* (2013.01)
*H04L 12/66* (2006.01)
*H04L 29/06* (2006.01)
*H04L 29/08* (2006.01)
*H04L 12/14* (2006.01)
*H04L 12/26* (2006.01)
*H04M 15/00* (2006.01)
(Continued)

(52) U.S. Cl.
CPC .......... *H04L 12/1435* (2013.01); *H04L 12/14* (2013.01); *H04L 12/1403* (2013.01); *H04L 12/1407* (2013.01); *H04L 12/66* (2013.01); *H04L 41/0896* (2013.01); *H04L 43/0876* (2013.01); *H04L 65/604* (2013.01); *H04L 67/22* (2013.01); *H04M 15/00* (2013.01); *H04M 15/66* (2013.01); *H04M 15/8214* (2013.01); *H04M 15/8228* (2013.01); *H04W 4/24* (2013.01)

(58) Field of Classification Search
USPC ....... 709/224, 219, 225, 223, 231–235, 226, 709/238, 249
See application file for complete search history.

(56) References Cited

U.S. PATENT DOCUMENTS 7,873,074 B1  1/2011 Boland
8,041,808 B1  10/2011 Becker
(Continued)

FOREIGN PATENT DOCUMENTS

WO  WO 2013/191963 A1  12/2013
WO  WO 2015/038277 A1  3/2015
(Continued)

*Primary Examiner* — Jude Jean Gilles (57) ABSTRACT

A system, apparatus, and method for controlling data usage at a customer premises. A gateway configured as a single point of entry receives all data entering the premises. All data usage by client devices within the premises is monitored. A DataCap Management Unit adjusts a premises bandwidth cap throughout a billing cycle to prevent the data usage from exceeding a data cap before the billing cycle ends.

19 Claims, 5 Drawing Sheets

(51) Int. Cl.
*H04W 4/24* (2018.01)
*G06F 15/16* (2006.01)

(56) References Cited

U.S. PATENT DOCUMENTS

| | | | |
|---|---|---|---|
| 8,489,720 B1* | 7/2013 | Morford | H04L 41/0896 709/223 |
| 8,681,614 B1 | 3/2014 | McCanne et al. | |
| 9,264,508 B2 | 2/2016 | Wolf et al. | |
| 9,628,405 B2 | 4/2017 | Dasher et al. | |
| 9,973,547 B1* | 5/2018 | Simms | H04L 67/02 |
| 2002/0023168 A1 | 2/2002 | Bass et al. | |
| 2004/0228277 A1* | 11/2004 | Williams | H04L 41/0681 370/230 |
| 2008/0037420 A1 | 2/2008 | Tang | |
| 2009/0028182 A1* | 1/2009 | Brooks | H04L 41/0896 370/466 |
| 2009/0031384 A1* | 1/2009 | Brooks | H04N 21/23439 725/127 |
| 2011/0188439 A1 | 8/2011 | Mao et al. | |
| 2011/0251807 A1* | 10/2011 | Rada | G01D 4/00 702/61 |
| 2011/0299412 A1* | 12/2011 | Diab | H04L 12/12 370/252 |
| 2014/0280764 A1 | 9/2014 | Dasher et al. | |
| 2014/0281002 A1 | 9/2014 | Sun | |
| 2014/0282777 A1 | 9/2014 | Gonder et al. | |
| 2015/0249623 A1 | 9/2015 | Phillips et al. | |
| 2015/0334150 A1 | 11/2015 | Dasher et al. | |
| 2016/0014439 A1* | 1/2016 | Friedrich | H04N 21/23439 725/92 |
| 2016/0323201 A1* | 11/2016 | Choen | G06F 16/95 |
| 2018/0109468 A1* | 4/2018 | Sridhar | H04L 5/006 |

FOREIGN PATENT DOCUMENTS

| | | |
|---|---|---|
| WO | WO 2015/155679 A1 | 10/2015 |
| WO | WO 2016/128890 A1 | 8/2016 |

* cited by examiner

SYSTEM, APPARATUS, AND METHOD PROVIDING DATA CAP AVOIDANCE

RELATED APPLICATIONS

This application claims the benefit of U.S. Provisional Application No. 62/359,374 filed Jul. 7, 2016, the disclosure of which is fully incorporated herein by reference.

TECHNICAL FIELD

The present disclosure relates to communication systems, and more particularly to a system, apparatus, and method for controlling delivery of data to a user to remain within a data cap while avoiding excessive data throttling.

BACKGROUND

Many network providers implement a "data cap", which limits the amount of data a user may consume, penalty free, over a period of time (for example, a month). If the user consumes more data than the cap allows, the provider may cut them off entirely from data, throttle their data to a very slow level, or impose exorbitant charges for overages. Existing technology lets users use data as fast as they want until they are suddenly cut off, throttled, or hit with an exorbitant charge.

Adaptive video bitrate (ABR) algorithms exacerbate this problem by balancing the bitrate (or quality of the video) with the current network conditions, with the goal of having the highest bitrate video possible.

SUMMARY

Existing technology controls bitrates at the application level, preventing a more organized decision-making process regarding the bitrate.

The present disclosure addresses the problems of the existing technology through a DataCap Management Unit that has the explicit goal of using 100% of the data cap no sooner than the end of the monitoring period. In this way, the unit prevents a user from suddenly running out of data, and ensures that the user utilizes all of the data up to the data cap, which in most cases has already been paid for by the user.

The DataCap Management Unit may be implemented in a custom over the top (OTT) gateway at the customer premises. This OTT gateway may communicate with the outside world by connecting to the service provider's gateway. By providing the sole connection for the household premises to connect to the Internet, the OTT gateway is able to monitor all data usage of the premises.

The DataCap Management Unit performs calculations to determine (based on past data usage patterns), the rate at which current ABR video should be played in order to meet the data cap at the end of the monitoring period.

In one embodiment, the present disclosure is directed to a method of controlling data usage at a customer premises. The method includes the steps of monitoring all data usage at a single point of entry for the premises; and adjusting a premises bandwidth cap throughout a billing cycle to prevent the data usage from exceeding a data cap before the billing cycle ends.

In another embodiment, the present disclosure is directed to an apparatus for controlling data usage at a customer premises. The apparatus includes an interface configured to receive all data entering the premises and to monitor all data usage by the premises; and a DataCap Management Unit configured to adjust a premises bandwidth cap throughout a billing cycle to prevent the data usage from exceeding a data cap before the billing cycle ends.

In another embodiment, the present disclosure is directed to a system for controlling data usage at a customer premises. The system includes a gateway providing a single point of entry for data entering the premises; an interface configured to receive all data entering the premises from the gateway and to monitor all data usage by the premises; and a DataCap Management Unit configured to adjust a premises bandwidth cap throughout a billing cycle to prevent the data usage from exceeding a data cap before the billing cycle ends.

The DataCap Management Unit benefits end users by allowing them to enjoy video without worrying about going over their data cap. The DataCap Management Unit benefits content providers by allowing more content to be consumed and creating happier customers. Because the unit accurately predicts data usage, it allows users to use as much data as possible for as long as possible while still avoiding going over the data cap. Operation of the DataCap Management Unit may also be optimized based on individual household usages.

Further features and benefits of embodiments of the present disclosure will become apparent from the detailed description below.

BRIEF DESCRIPTION OF THE DRAWINGS

In the following section, the disclosed system, apparatus, and method will be described with reference to exemplary embodiments illustrated in the figures, in which.

DETAILED DESCRIPTION

Figure 1:
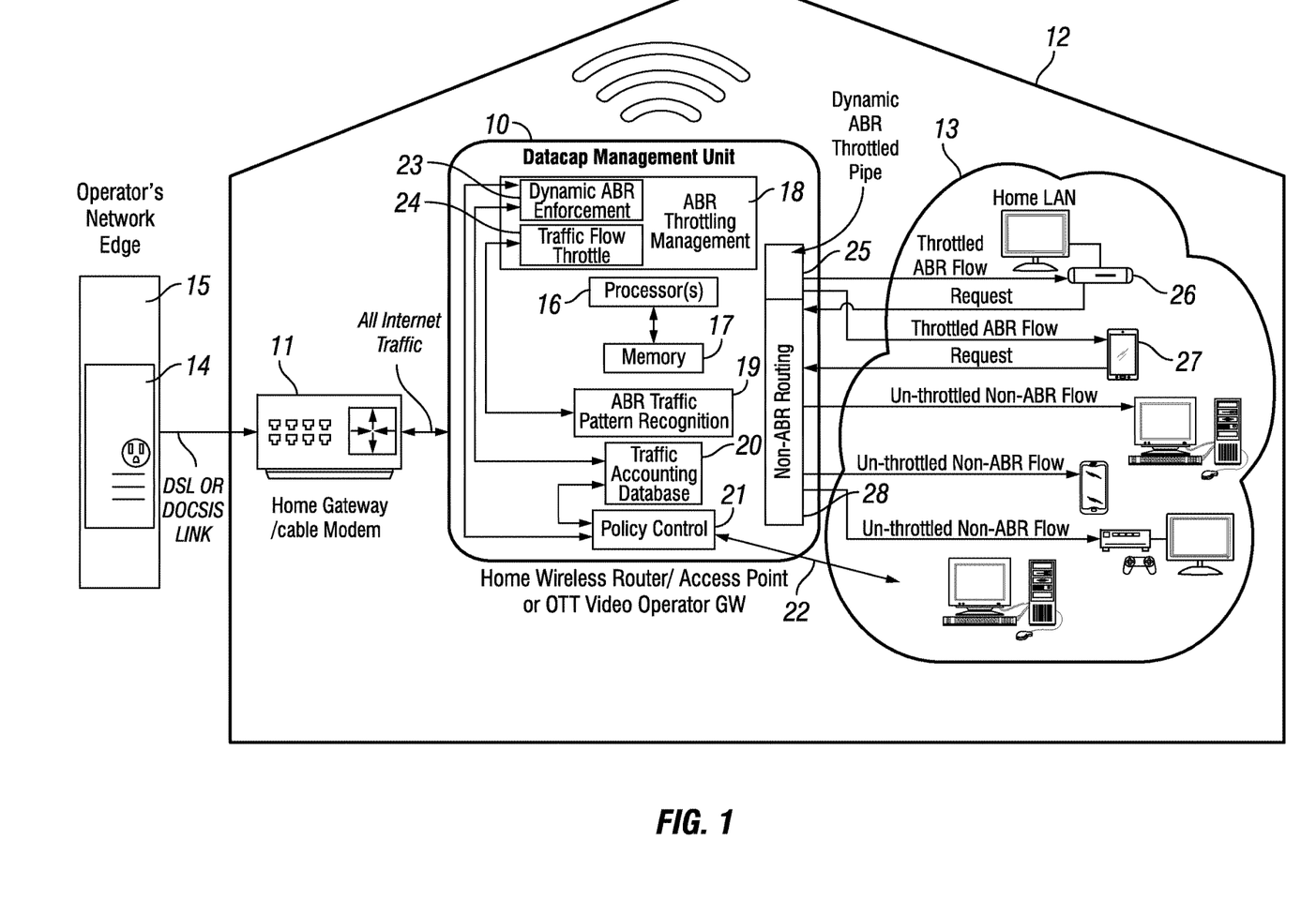
FIG. 1 is a simplified block diagram of an exemplary embodiment of the disclosed DataCap Management Unit.

FIG. 1 is a simplified block diagram of an exemplary embodiment of the disclosed DataCap Management Unit 10 implemented between an Internet Service Provider (ISP) home gateway or cable modem 11 and all other client devices in a home 12. The DataCap Management Unit may be implemented, for example, in a home wireless router/access point, in an Over-the-Top (OTT) video operator gateway, or in another suitable gateway-type access point where all Internet traffic entering the premises may be monitored. The client devices may be connected to a Home Local Area Network (LAN) 13. Data may reach the home from a service provider's gateway 14 in an operator's network 15 via, for example, a Digital Subscriber Line (DSL) or Data Over Cable Service Interface Specification (DOCSIS) link. The gateway may be, for example a Digital Subscriber Line Access Multiplexer (DSLAM) or a Cable Modem Termination System (CMTS).

Figure 2:
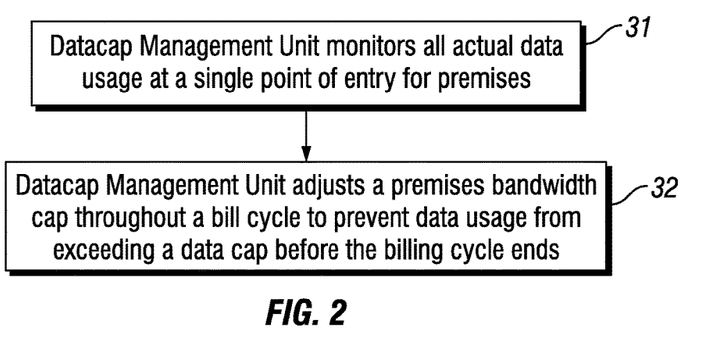
FIG. 2 is a flow chart of an overall method of data cap management in an exemplary embodiment of the present disclosure.

Referring briefly to FIG. 2, there is shown a flow chart of an overall method of data cap management performed by the DataCap Management Unit 10 in an exemplary embodiment of the present disclosure. At step 31, the DataCap Management Unit monitors all data usage at a single point of entry for the premises. At step 32, the DataCap Management Unit adjusts a premises bandwidth cap throughout a billing cycle to prevent the data usage from exceeding a data cap before the billing cycle ends.

Referring again to FIG. 1, the DataCap Management Unit 10 may include a number of units controlled by one or more processors 16 executing computer program instructions stored on a memory 17. The units may include an ABR Throttling Management Unit 18, an ABR Traffic Pattern Recognition Unit 19, an All Traffic Accounting Database 20 for the current billing cycle, and a Policy Control Unit 21 that provides policy control for the subscriber data cap and the billing cycle. A DataCap Policy Management Interface 22 enables a user to optimize policies based on individual household usage patterns. The ABR Throttling Management Unit 18 may further include a unit for dynamic ABR pipe bandwidth size enforcement 23 and a traffic flow throttle 24. A dynamic ABR throttled pipe 25 delivers throttled ABR stream flows to client devices engaged in ABR sessions such as, in this example, an ABR Set Top Box (STB) 26 and a tablet computer 27. A non-ABR routing unit 28 routes un-throttled non-ABR stream flows to client devices engaged in non-ABR sessions.

The various units interact to perform the actual throttling of ABR content, the recognition of ABR content (as in U.S. patent application Ser. No. 14/660,811 entitled *System and Method for Categorizing Packet Flows in a Network*), the recognition of data use patterns, the ability to predict future data usage, and to allow a household to control the policies of the DataCap Management Unit. In the illustrated embodiment, any device can connect to the unit in order to perform standard Internet interactions, but only ABR stream flows are throttled. Non-ABR stream flows are un-throttled.

Figure 3:
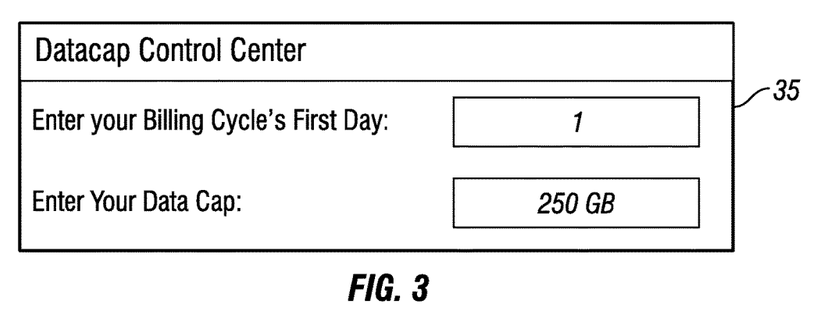
FIG. 3 shows an exemplary customer-facing interface.

FIG. 3 shows an exemplary customer-facing interface 35 that enables the customer to input information to the DataCap Management Unit 10 such as, for example, the data cap and the billing cycle start-date. This information might not be otherwise available to a third-party management system.

FIGS. 4-8 show example system states within a 1-month billing cycle period using the same scenario throughout the month. In this example, an algorithm is used to allow conservative bandwidth usage at first, with a more aggressive bandwidth usage pursued as it becomes clear the data cap is in no danger of being exceeded. Alternative algorithms may also be utilized, such as one providing a more constant bandwidth usage, or a more aggressive one that tapers off bandwidth usage at the end of the month.

The following terms are utilized in various formulas for determining the throttling of ABR traffic while considering the data cap:
- data cap in bits (C),
- bits used ($b_u$),
- bits remaining ($b_r$),
- time in a month ($t_m$),
- time used ($t_u$),
- time remaining ($t_r$),
- time spent pulling data throughout the entire month (the duty cycle) ($t_c$),
- calculated transient rate cap (r), and
- duty cycle-related rate factor ($\alpha$).

Figure 4:
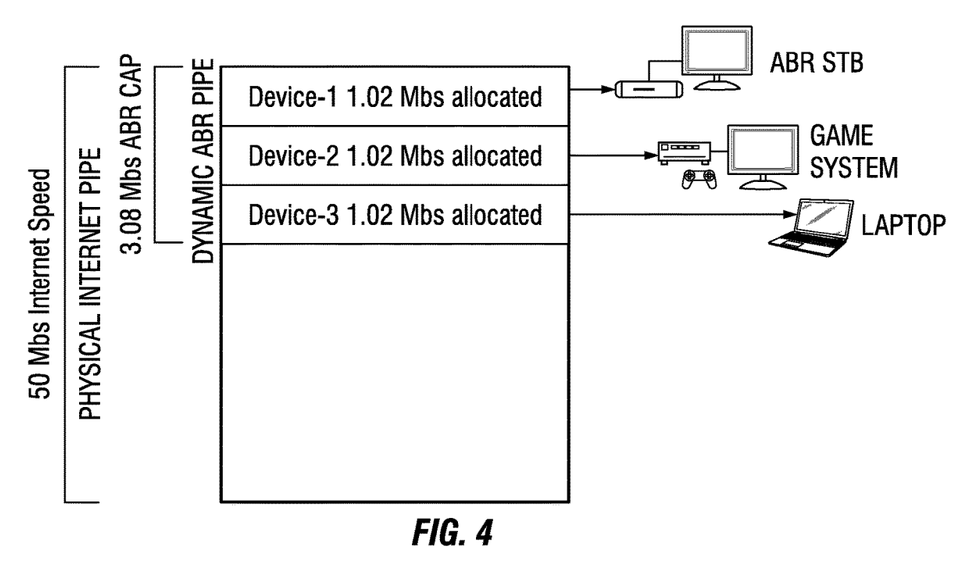
FIG. 4 illustrates an exemplary system state for day 1 of a billing cycle.

At the beginning of a billing cycle (for example a month), $t_u=0$ and $b_u=0$.

FIG. 4 illustrates a system state for day-1 of the billing cycle (30 days). In the scenario there is ABR traffic; there are three devices operating in the home; and there is a 50 Mbs pipe with a 250 Gigabyte data cap. The duty cycle-related rate factor ($\alpha$) is generated based on an average household size of 2.58 devices and average hours watched per person of 282 minutes per month. The result can be extremely restrictive for someone that does not follow the average consumption, but is necessary in order to stay within the data cap.

On day-1, the time used ($t_u$)=0 and the bits used ($b_u$)=0. Time remaining is calculated as:

$$t_r = t_m - t_u$$
$$= t_m - 0$$
$$= t_m$$
$$= 30 \text{ days}$$

Bits remaining is calculated as:

$$b_r = C - b_u$$
$$= C - 0$$
$$= C$$
$$= 250 \text{ GB}$$

The algorithm computes an ABR bandwidth cap for each day using the formula:

$$r = \alpha(b_r/t_r)$$

Alpha = 4.0

Bytes Remaining $b_r$ = 250000 Mbytes = 250000 × 8 × 1000000 bits

Time Remaining $t_r$ = 30 days = 30 × 24 × 60 × 60 seconds

Thus, the *ABR* bandwidth cap = 4 × (250000 × 8 × 1000000) / (30 × 24 × 60 × 60)
= 3086419.75308641975308641975308864 b/s
= 3.086419 Mbs Thus, for day-1, the algorithm computes a 3.08 Mbs ABR bandwidth cap. The dynamic ABR pipe allocates this bit rate to the three devices with approximately 1.02 Mbs per device.

Figure 5:
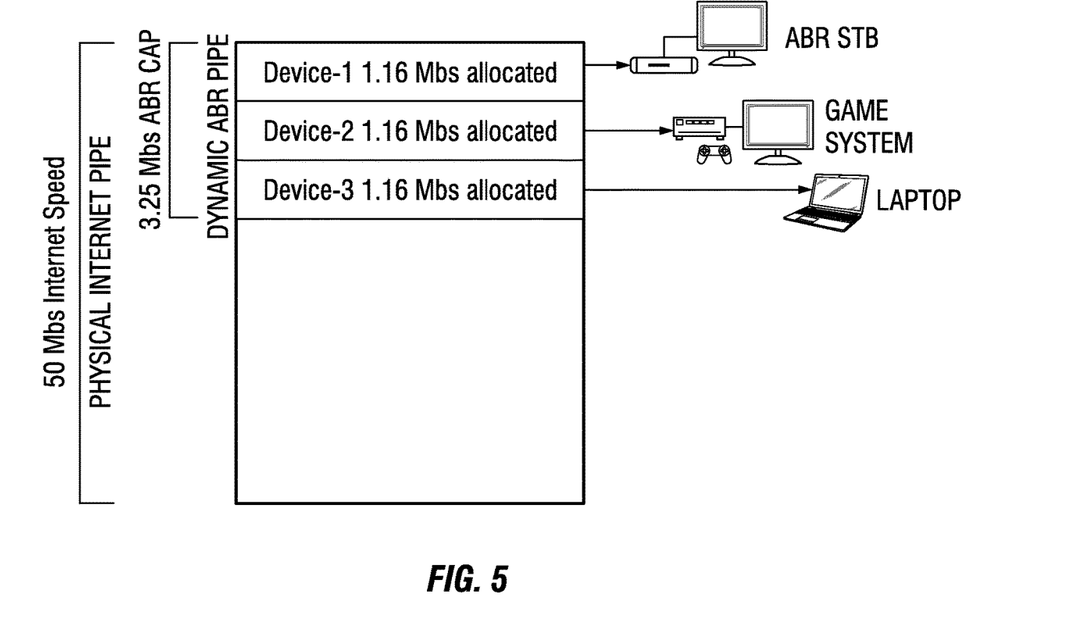
FIG. 5 illustrates an exemplary system state for day 5 of the billing cycle.

FIG. 5 illustrates a system state for day-5 of the billing cycle. In the scenario there is ABR traffic; there are three devices operating in the home; and there is a 50 Mbs pipe with a 250 Gigabyte data cap. The duty cycle-related rate factor ($\alpha$) is generated based on an average household size of 2.58 devices and average hours watched per person of 282 minutes per month. In the same manner as shown above, the algorithm computes a 3.25 Mbs ABR bandwidth cap for day-5. The dynamic ABR pipe allocates this bit rate to the three devices with approximately 1.16 Mbs per device.

Figure 6:
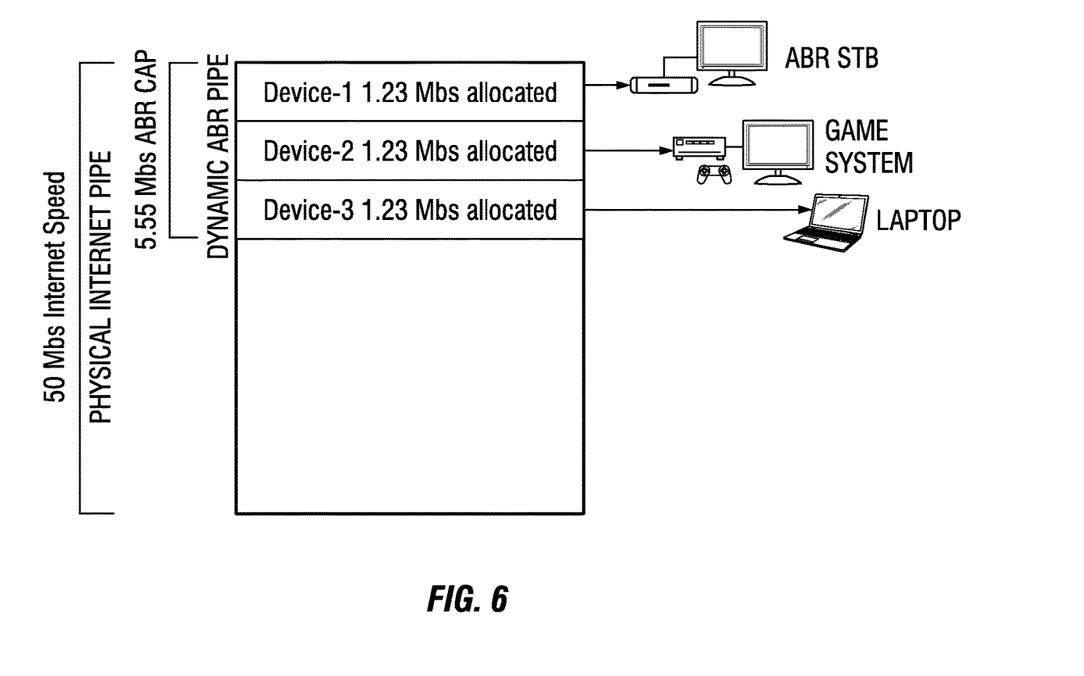
FIG. 6 illustrates an exemplary system state for day 15 of the billing cycle.

FIG. 6 illustrates a system state for day-16 of the billing cycle. In the scenario there is ABR traffic; there are three devices operating in the home; and there is a 50 Mbs pipe with a 250 Gigabyte data cap. The duty cycle-related rate factor (α) is generated based on an average household size of 2.58 devices and average hours watched per person of 282 minutes per month. The algorithm computes a 5.55 Mbs ABR bandwidth cap for day-16. The dynamic ABR pipe allocates this bit rate to the three devices with approximately 1.23 Mbs per device.

Figure 7:
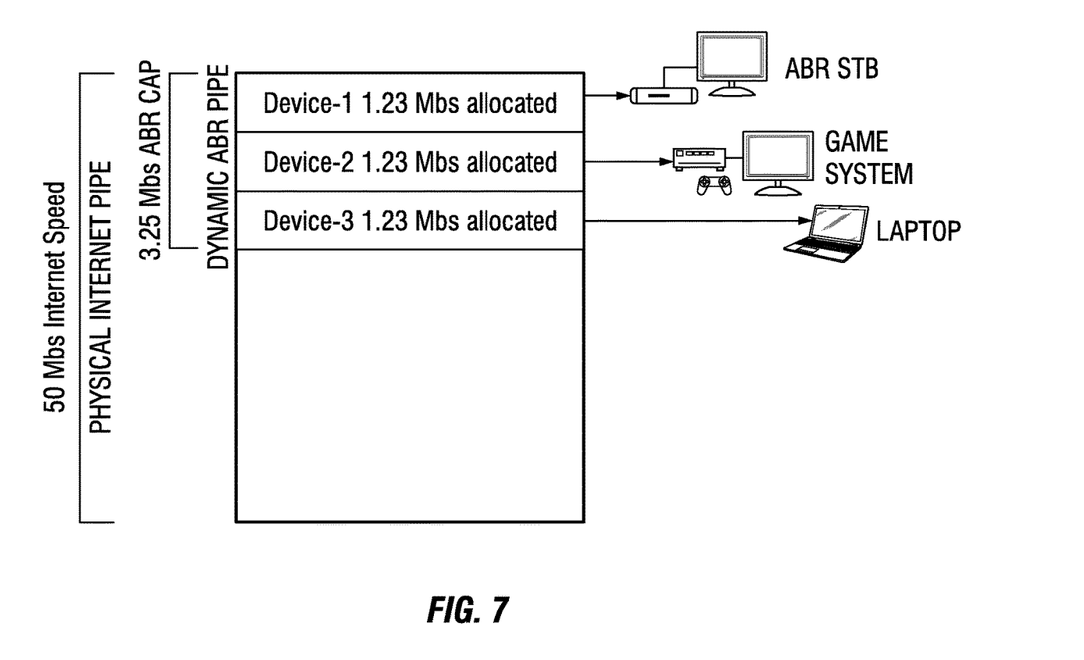
FIG. 7 illustrates an exemplary system state for day 25 of the billing cycle.

FIG. 7 illustrates a system state for day-25 of the billing cycle. In the scenario there is ABR traffic; there are three devices operating in the home; and there is a 50 Mbs pipe with a 250 Gigabyte data cap. The duty cycle-related rate factor (α) is generated based on an average household size of 2.58 devices and average hours watched per person of 282 minutes per month. The algorithm computes a 5.55 Mbs ABR bandwidth cap for day-25. The dynamic ABR pipe allocates this bit rate to the three devices with approximately 1.23 Mbs per device.

Figure 8:
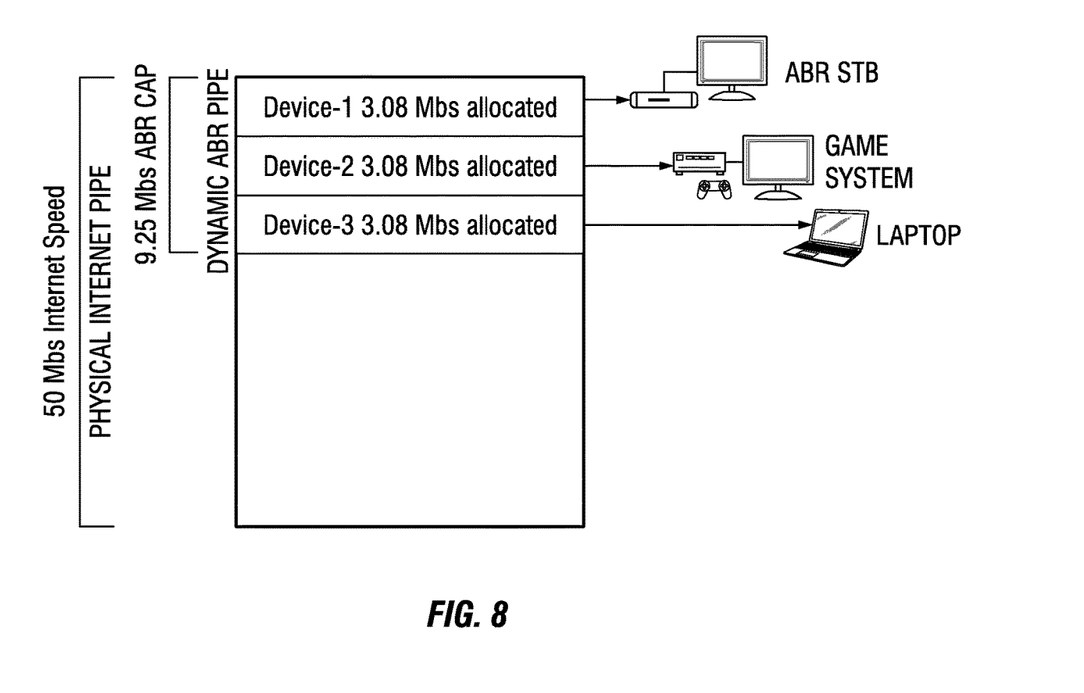
FIG. 8 illustrates an exemplary system state for day 29 of the billing cycle.

FIG. 8 illustrates a system state for day-29 of the billing cycle. In the scenario there is ABR traffic; there are three devices operating in the home; and there is a 50 Mbs pipe with a 250 Gigabyte data cap. The duty cycle-related rate factor (α) is generated based on an average household size of 2.58 devices and average hours watched per person of 282 minutes per month. The algorithm computes a 9.25 Mbs ABR bandwidth cap for day-29. The dynamic ABR pipe allocates this bit rate to the three devices with approximately 3.08 Mbs per device.

Figure 9:
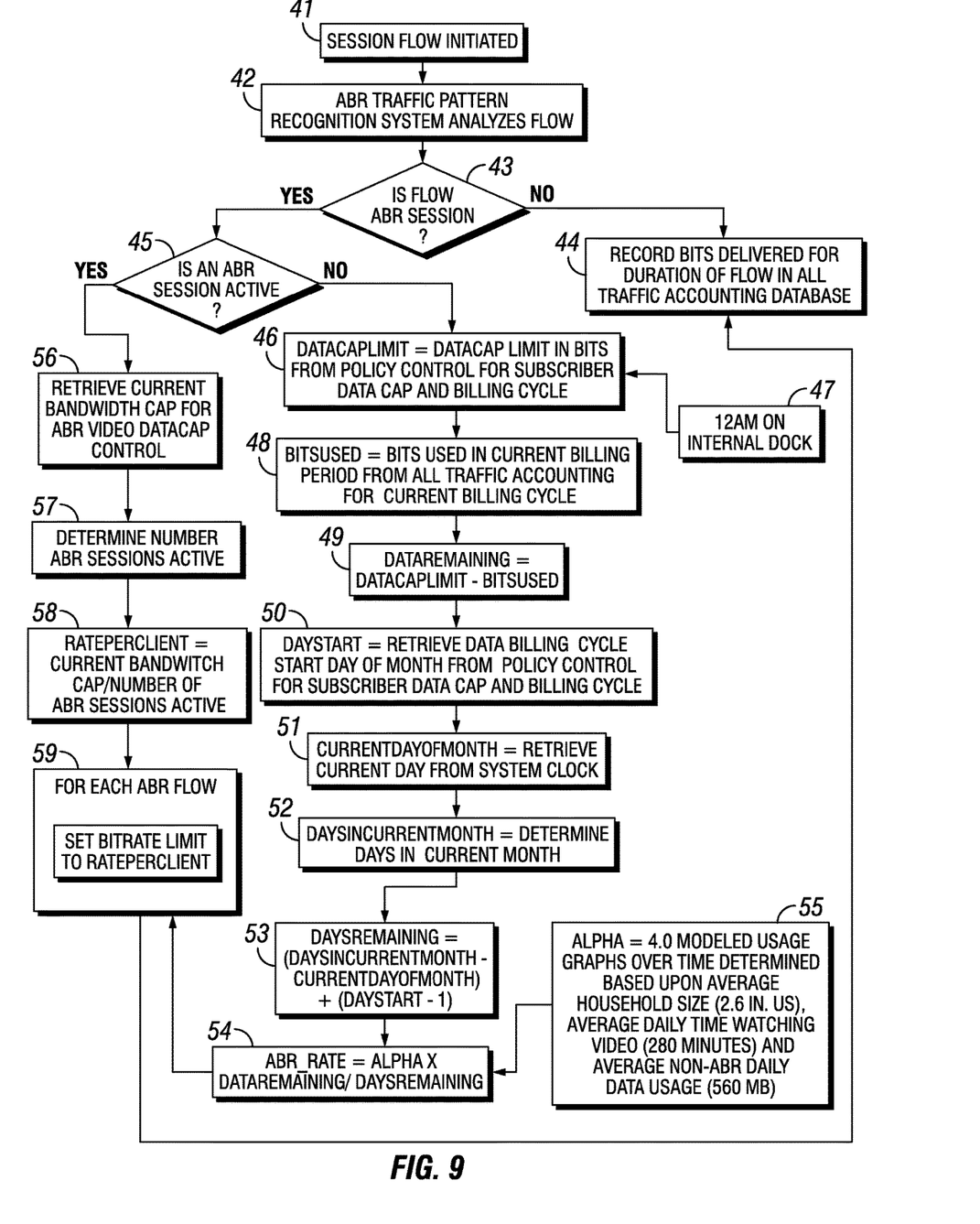
FIG. 9 is a flow chart illustrating the steps of an exemplary embodiment of the disclosed method.

FIG. 9 is a flow chart illustrating the steps of an exemplary embodiment of a method performed by the DataCap Management Unit 10. The unit recognizes ABR flows, with non-ABR flows being used for accounting, but not for throttling. ABR flows are throttled based on projected data cap usage.

The illustrated method begins at step 41, where session flow to the home is initiated. At step 42, the ABR Traffic Pattern Recognition Unit 19 analyzes the flow. At step 43 the ABR Traffic Pattern Recognition Unit determines whether the flow is an ABR session. If not, the method moves to step 44 where bits delivered for the duration of the flow are recorded in the All Traffic Accounting Database 20. However, if it is determined at step 43 that the flow is an ABR session, the method moves to step 45 where the ABR Traffic Pattern Recognition Unit determines whether an ABR session is active.

If it is determined that an ABR session is not active, the method moves to step 46, where the term dataCapLimit is set equal to DataCap Limit in bits obtained from the Policy Control for Subscriber Data Cap and Billing Cycle Unit 21. As shown in block 47, an internal system clock is set at the start of the day, i.e., 12:00 am. At step 48, the term bitsUsed is set equal to the bits used in the current billing period as obtained from the All Traffic Accounting Database for Current Billing Cycle 20. At step 49, the term dataRemaining is calculated using the formula:

dataRemaining=dataCapLimit−bitsUsed i.e., $b_r = C - b_u$.

At step 50, the term dayStart is set equal to the Data Billing Cycle Start Day of the Month as retrieved from the Policy Control for Subscriber Data Cap and Billing Cycle Unit 21. At step 51, the term currentDayOfMonth is set equal to the current day retrieved from the internal system clock. At step 52, the term daysInCurrentMonth is set equal to the determined number of days in the current month. At step 53, the term daysRemaining is calculated using the formula:

daysRemaining=(daysInCurrentMonth−currentDayOfMonth)+(dayStart−1).

At step 54, the term ABR_Rate is calculated using the formula:

ABR_Rate=Alpha×dataRemaining/daysRemaining i.e., $r = \alpha(b_r/t_r)$.

As shown in block 55, in this example, the term Alpha is set equal to 4.0. This value is determined using modeled usage graphs over time based upon an average household size of 2.6 devices, average daily time watching video of 280 minutes, and average non-ABR daily data usage of 560 MB.

If it is determined at step 45 that an ABR session is active, the method moves to step 56 where the current bandwidth cap for ABR video is retrieved from the Policy Control Unit 21. At step 57 the ABR Traffic Pattern Recognition Unit 19 determines the number of ABR sessions that are active. At step 58, the ABR Throttling Management Unit 18 calculates the term RatePerClient using the formula:

RatePerClient=current bandwidth cap/Number of ABR sessions active.

At step 59, for each ABR flow, the ABR Throttling Management Unit 18 sets a bit rate limit to the calculated RatePerClient using as an input, the ABR_Rate calculated in step 54. The method then moves to step 44, where the bits delivered for the duration of the flow are recorded in the All Traffic Accounting Database 20.

Thus, the bitrate of a piece of ABR content is controlled by the DataCap Management Unit 10 based on data usage limits (as well as traditional metrics such as network conditions), allowing data caps to be avoided. ABR clients are still free to select bitrate profiles.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A computer-controlled method of controlling data usage at a customer premises, the method comprising:
monitoring all data usage at a single point of entry for the premises;
adjusting a premises bandwidth cap throughout a billing cycle to prevent the data usage from exceeding a data cap before the billing cycle ends; and
throttling only Adaptive Bitrate (ABR) data streams to maintain a current premises bitrate within the premises bandwidth cap.

2. The method according to claim 1, further comprising:
determining whether a data flow is an ABR data session; and
when the data flow is not an ABR session, recording in a database, a number of bits delivered for a duration of the data flow.

3. The method according to claim 1, further comprising:
determining that a data flow is an ABR data session;
determining whether any ABR data sessions are active; and when no ABR sessions are active, determining an allowed ABR rate based on historical usage patterns, amount of data remaining within the data cap, and number of days remaining in the billing cycle.

4. The method according to claim 3, wherein the historical usage patterns include historical data usage based on an average number of clients per premises, average time per day that users watch video, and average non-ABR daily data usage.

5. The method according to claim 3, wherein when ABR sessions are active, the method includes:
determining a number of ABR sessions that are active; and
calculating an allowed data rate per ABR client based on the current premises bandwidth cap divided by the number of active ABR sessions.

6. The method according to claim 5, wherein throttling only ABR data streams includes setting a bitrate limit for each client engaged in an ABR session by applying the allowed ABR rate.

7. An apparatus for controlling data usage at a customer premises, the apparatus comprising:
an interface configured to receive data entering the premises and to monitor data usage by the premises; and
a DataCap Management Unit having a processing circuit configured to adjust a premises bandwidth cap throughout a billing cycle to prevent the data usage from exceeding a data cap before the billing cycle ends,
wherein the DataCap Management Unit includes an Adaptive Bitrate (ABR) Throttling Management Unit configured to throttle only ABR data streams to maintain a current premises bitrate within the premises bandwidth cap.

8. The apparatus according to claim 7, wherein the DataCap Management Unit also includes:
an ABR Traffic Pattern Recognition Unit configured to determine whether a data flow is an ABR data session; and
an All Traffic Accounting Database configured to record a number of bits delivered for a duration of the data flow when the data flow is not an ABR session.

9. The apparatus according to claim 7, wherein the DataCap Management Unit also includes:
an ABR Traffic Pattern Recognition Unit configured to determine that a data flow is an ABR data session and to determine whether any ABR data sessions are active; and
wherein the ABR Throttling Management Unit is configured to determine an allowed ABR rate based on historical usage patterns, amount of data remaining within the data cap, and number of days remaining in the billing cycle when no ABR sessions are active.

10. The apparatus according to claim 9, wherein the historical usage patterns include historical data usage based on an average number of clients per premises, average time per day that users watch video, and average non-ABR daily data usage.

11. The apparatus according to claim 9, wherein when ABR sessions are active, the ABR Traffic Pattern Recognition Unit is configured to determine a number of ABR sessions that are active; and
the ABR Throttling Management Unit is configured to calculate an allowed data rate per ABR client based on the current premises bandwidth cap divided by the number of active ABR sessions.

12. The apparatus according to claim 11, wherein throttling only ABR data streams includes setting a bitrate limit for each client engaged in an ABR session by applying the allowed ABR rate.

13. A system for controlling data usage at a customer premises, the system comprising:
a gateway providing a single point of entry for data entering the premises;
an interface configured to receive the data entering the premises from the gateway and to monitor data usage by the premises; and
a DataCap Management Unit having a processing circuit configured to adjust a premises bandwidth cap throughout a billing cycle to prevent the data usage from exceeding a data cap before the billing cycle ends,
wherein the DataCap Management Unit includes an Adaptive Bitrate (ABR) Throttling Management Unit configured to throttle only ABR data streams to maintain a current premises bitrate within the premises bandwidth cap.

14. The system according to claim 13, wherein the DataCap Management Unit also includes:
an ABR Traffic Pattern Recognition Unit configured to determine whether a data flow is an ABR data session; and
an All Traffic Accounting Database configured to record a number of bits delivered for a duration of the data flow when the data flow is not an ABR session.

15. The system according to claim 13, wherein the DataCap Management Unit also includes:
an ABR Traffic Pattern Recognition Unit configured to determine that a data flow is an ABR data session and to determine whether any ABR data sessions are active; and
wherein the ABR Throttling Management Unit is configured to determine an allowed ABR rate based on historical usage patterns, amount of data remaining within the data cap, and number of days remaining in the billing cycle when no ABR sessions are active.

16. The system according to claim 15, wherein the historical usage patterns include historical data usage based on an average number of clients per premises, average time per day that users watch video, and average non-ABR daily data usage.

17. The system according to claim 15, wherein when ABR sessions are active, the ABR Traffic Pattern Recognition Unit is configured to determine a number of ABR sessions that are active; and
the ABR Throttling Management Unit is configured to calculate an allowed data rate per ABR client based on the current premises bandwidth cap divided by the number of active ABR sessions.

18. The system according to claim 17, wherein throttling only ABR data streams includes setting a bitrate limit for each client engaged in an ABR session by applying the allowed ABR rate.

19. The system according to claim 18, further comprising:
a dynamic ABR throttled pipe configured to deliver throttled ABR stream flows to client devices engaged in ABR sessions; and
a non-ABR routing unit configured to route un-throttled non-ABR stream flows to client devices engaged in non-ABR sessions.

* * * * *